(12) United States Patent
Hofseth et al.

(10) Patent No.: US 9,932,114 B2
(45) Date of Patent: Apr. 3, 2018

(54) METHOD FOR CONTROLLING THE VACUUM GENERATOR(S) IN A VACUUM SEWAGE SYSTEM

(75) Inventors: Olay Hofseth, Ulsteinvik (NO); Eimund Øvsthus, Lonevåg (NO)

(73) Assignee: Jets AS, Hareid (NO)

( * ) Notice: Subject to any disclaimer, the term of this patent is extended or adjusted under 35 U.S.C. 154(b) by 1823 days.

(21) Appl. No.: 13/002,063

(22) PCT Filed: Jul. 8, 2009

(86) PCT No.: PCT/NO2009/000252
§ 371 (c)(1),
(2), (4) Date: Feb. 8, 2011

(87) PCT Pub. No.: WO2010/005313
PCT Pub. Date: Jan. 14, 2010

(65) Prior Publication Data
US 2011/0129355 A1 Jun. 2, 2011

(30) Foreign Application Priority Data
Jul. 10, 2008 (NO) .................................. 20083096

(51) Int. Cl.
*E03D 11/00* (2006.01)
*F04B 41/06* (2006.01)
(Continued)

(52) U.S. Cl.
CPC .............. *B64D 11/02* (2013.01); *E03F 1/006* (2013.01); *F04C 19/00* (2013.01); *F04C 25/02* (2013.01);
(Continued)

(58) Field of Classification Search
CPC ........................................................ B64D 11/02
(Continued)

(56) References Cited

U.S. PATENT DOCUMENTS 2,971,691 A 2/1961 Lorenz
4,655,688 A * 4/1987 Bohn et al. ..................... 417/18
(Continued)

FOREIGN PATENT DOCUMENTS

| CN | 1046007 A | 10/1990 |
| EP | 0333045 A1 | 9/1989 |
| WO | WO9010123 A | 9/1999 |

OTHER PUBLICATIONS

TheEngineeringtoolbox.com dated Jun. 21, 2007 (Pump Affinity Laws).*
McNallyinstitute.com dated Jun. 10, 2007.*
International Search Report and Written Opinion issued in counterpart PCT Application PCT/NO2009/000252, dated Oct. 12, 2009 (6 pages).

*Primary Examiner* — Christine Skubinna
(74) *Attorney, Agent, or Firm* — Wood Herron & Evans LLP

(57) ABSTRACT

Method for controlling one or more vacuum generators (1) and thereby the vacuum in a vacuum sewage system, in particular controlling one or more liquid ring screw pumps in such system, including beyond the generator/s (1) one or more tubular collectors or suction pipelines (2) connected to the vacuum generator and one or more toilets, urinals, grey water sinks etc (3, 4), connected to the suction pipeline through branch pipelines (6). The rotational speed of the vacuum generator (1) is controlled on the basis of the set vacuum requirement.

4 Claims, 6 Drawing Sheets

(51) Int. Cl.
  *F04B 49/00* (2006.01)
  *F04C 19/00* (2006.01)
  *B64D 11/02* (2006.01)
  *E03F 1/00* (2006.01)
  *F04C 25/02* (2006.01)
  *F04C 28/06* (2006.01)
  *F04C 28/08* (2006.01)
(52) U.S. Cl.
  CPC .............. *F04C 28/06* (2013.01); *F04C 28/08* (2013.01); *F04C 2270/56* (2013.01)
(58) Field of Classification Search
  USPC ..... 4/431–433, 300, DIG. 9; 417/3–5, 44, 2, 417/426
  See application file for complete search history.

(56) References Cited

U.S. PATENT DOCUMENTS

| | | |
|---|---|---|
| 5,344,085 A | 9/1994 | Hofseth |
| 5,742,500 A | 4/1998 | Irvin |
| 5,845,599 A | 12/1998 | Bova |
| 5,960,736 A | 10/1999 | Ludington |
| 6,056,510 A | 5/2000 | Miurai |
| 6,579,067 B1 * | 6/2003 | Holden .............................. 417/2 |
| 2005/0016588 A1 | 1/2005 | Shimizu |

* cited by examiner

METHOD FOR CONTROLLING THE VACUUM GENERATOR(S) IN A VACUUM SEWAGE SYSTEM

The present invention relates to a method for controlling the vacuum generator/s and thereby the vacuum in a vacuum sewage system, in particular controlling one or more liquid ring screw pumps in such system, including beyond the generator/s one or more tubular collectors or suction pipelines connected to the vacuum generator and one or more toilets, urinals, grey water sinks etc. connected to the suction pipeline/s.

Vacuum sewage systems of the above-mentioned kind are commonly known and dominating in connection with the use onboard ships, aero planes and trains. However, on land such systems are also increasingly used and the background for such increased use is primarily the reduced use of water and easy handling and treatment of waste water, as well as the flexible system as regards installation of the pipes given by such system.

The applicant of the present application introduced in 1987, cf. EP patent No. 0 287 350, a novel vacuum sewage system where the vacuum in the system is generated by means of a liquid ring screw pump and where the pump is used as well to discharge the sewage from a vacuum tank to which it is connected.

EP patent No. 0 454 794, also filed by the applicant, further shows a revolutionary improvement of a vacuum sewage system where the liquid ring pump is provided with a grinder and is connected directly with the suction pipe of the system, whereby vacuum is generated in the sewage suction pipe and sewage is discharged directly from the system by means of the pump.

Still further U.S. Pat. No. 4,034,421 shows a vacuum sewer system where a tank is provided for the collection of sewage from water closets, the tank comprising a circulating pump whose inlet and outlet are connected to the tank and which is adapted to circulate the tank contents in a closed path for agitation, communication and aeration thereof, and where a liquid jet pump is inserted in the closed path to establish the required vacuum for the sewer system.

A common disadvantage of all of the above-mentioned systems, in particular large sewage systems comprising a large number of toilets etc, and two ore more vacuum generators, is that the vacuum generators are intermittently driven (on/off) on the basis of the vacuum level in the system. Thus, the vacuum pumps or generators starts when the vacuum reaches a higher limit, normally 40% vacuum, and stops when the vacuum reaches a lower limit, normally 60% vacuum (relative to atmospheric pressure). Such intermittent running of the vacuum generators is inefficient (higher energy consumption) and is causing increased wear on the generators resulting in increased maintenance of the system. Besides, on-off control of the vacuum generators, with the generators running at constant high speed (when running), contributes to the generation of more heath to the vacuum generators and thereby higher temperature in the generators thereby, when using liquid ring pumps, causing evaporation of the liquid in the pumps and sooner breakdown of the liquid ring in the pump. Such break-down will in turn result in loss of vacuum in these kinds of pumps.

With the present invention is provided a method for controlling the vacuum pumps or vacuum generators in a vacuum sewage system where the above disadvantage is vastly reduced or eliminated and which is more energy efficient and require less maintenance.

The invention is characterized by the features as defined in the attached independent claim 1.

Advantageous features of the invention is further defined in the attached dependent claims 2-4.

The invention will be further described in the following by way of examples and with reference to the drawings where:

Figure 1:
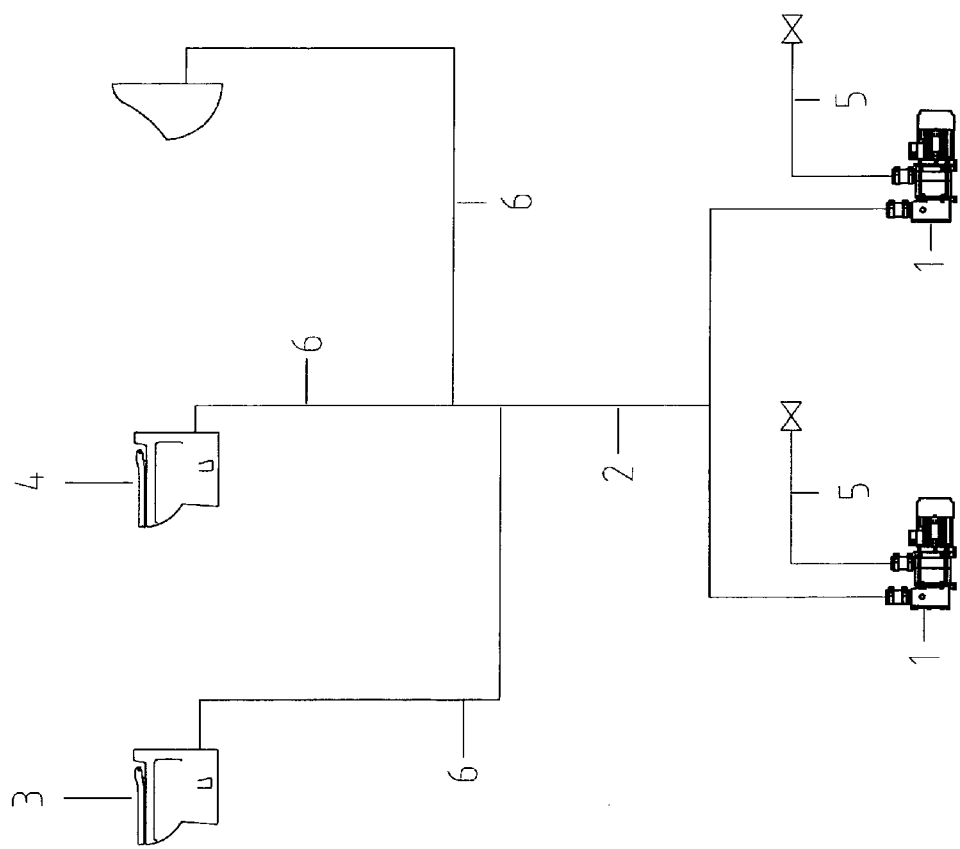
FIG. 1 shows, as an example, a schematic sketch of a vacuum sewage system.

FIG. 1 shows, as stated above, an example of vacuum sewage system including two vacuum generators 1 in the form of liquid ring screw pumps with integrated macerators coupled in parallel, a common suction pipeline or collector tube 2 connected with the vacuum generators at one end and further connected with a number of toilets, urinals etc. 3, 4 through branch pipelines 6 at the other end. Vacuum is generated in the common suction pipe 2 and branch pipelines 6 by means of the vacuum generators 1 and, when flushing the toilets or urinals etc., successive charges of liquid and air is drawn towards the generators and discharged through an outlet 5 of the generator/s.

The system as shown in FIG. 1 is, as mentioned above, commonly controlled by on/off running of the vacuum generators. Thus, when the system is in a low mode state of use, for instance in the middle of the night when just a few or no toilets are used, only one vacuum generator is running when required, i.e. when the vacuum reaches the high set level (40% vacuum). As soon as the vacuum generator again reaches the low set level (60% vacuum) the vacuum generator will stop.

At high mode state of use, such as in the morning when a large number of toilets etc. are used, both vacuum generators will run simultaneously, and depending on the required vacuum during the day or night, only one vacuum generator will run intermittently, or one or both vacuum generators will run continuously and/or in combination intermittently.

With the present invention is provided a method for controlling (a control regime for) the vacuum generators in a vacuum sewage system which is based on continuous running of the generators, but with control of the rotational speed of the generators based on a preset vacuum pressure and required vacuum capacity.

Figure 5:
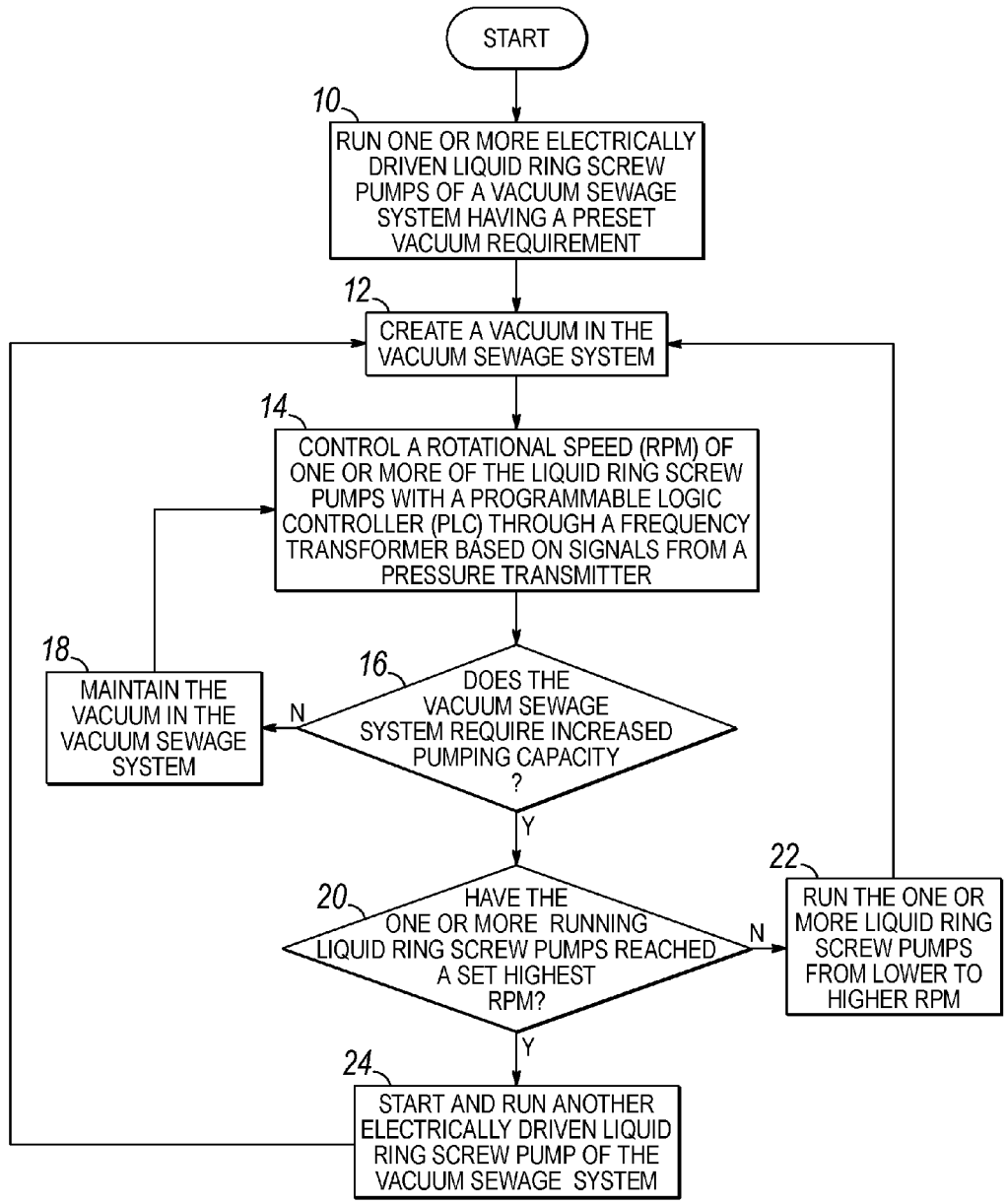
FIG. 5 shows a flow diagram of an exemplary control regime for a vacuum system.

FIG. 5 shows a flow diagram of an exemplary control regime for a vacuum system. With respect to blocks 10, 12, and 14 the vacuum generators in a vacuum sewage system are commonly powered by means of electrical motors and the rotational velocity (rpm) for each motor in the system is preferably controlled by means of programmable logic controller (PLC) through a frequency transformer on the basis of signals from a pressure transmitter. Thus, with the present invention, the desired vacuum is selected, normally 50%, and the PLC is set to control the rpm (revolution per minute) of the vacuum generator motor(s) based on the transmitted signal from the pressure transmitter in the vacuum system. In systems having two or more vacuum generators run I parallel, a preferred control regime would be, based on the required vacuum at any time, to program the PLC to run one first generator until it reaches a set highest rpm and then start the next, second generator if the vacuum system requires increased vacuum capacity, as indicated in blocks 16, 18, 20, 22 and 24. Then, when the second generator reaches its highest set rpm, and if further capacity is required, a third, fourth or more vacuum generator(s) is (are) started and run at the required rpm based on the selected vacuum of the system such that the vacuum is kept at the selected vacuum level (50%) at all times.

Figure 6:
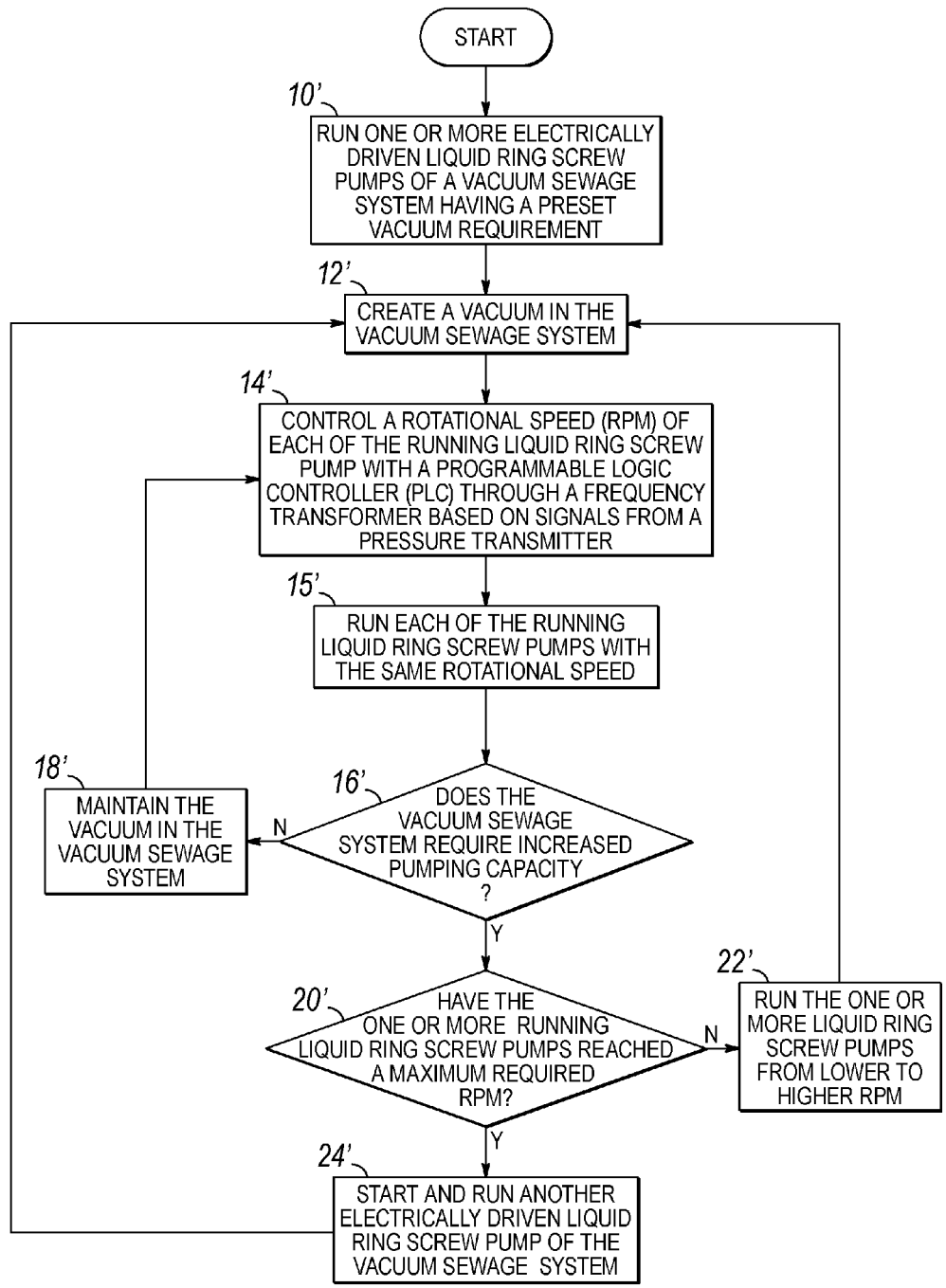
FIG. 6 shows a flow diagram of an exemplary alternative control regime for a vacuum system.

FIG. 6 shows a flow diagram of an exemplary alternative control regime for vacuum systems having two or more vacuum generators is to program the PLC to control the rpm for each generator such that they are run with the same rotational speed, from lower to higher rpm based on the required vacuum as indicated in blocks 10', 12', 14' and 15', but such that a new vacuum generator is started when more capacity is required and the running generator(s) is (are) running at a maximum required rpm, as indicated in blocks 16', 18', 20', 22', and 24'. This way of controlling the number of generators and each generator's rpm on the basis of the set vacuum and required vacuum capacity of the system may likely be as effective as the above preferred embodiment where each first, second etc. generator is run at full rpm and kept at full rpm before the next generator I started.

As a precaution, the PLC is preferably programmed to trigger an alarm if all of the pumps in the system is started and run at full capacity (rpm) and the set vacuum level is not reached after a period of time. In such case the vacuum systems needs to be checked with regard to possible leakages or other deficiencies that would cause low pressure.

Tests.

Extensive tests by the inventors of the present invention has proved that it is possible to maintain sufficient vacuum at a preset level by running liquid ring screw pumps with reduced rotational speed (rpm) and still maintain sufficient vacuum. i.e. 40% vacuum or below.

Equipment.

| | |
|---|---|
| Vacuum generator: | Jets NT 220 liquid ring screw pump |
| Electric motor: | Lonne 14GI86-4AA11-Z |
| | 230/400 V 50 Hz - 22 kW, 1465 rpm |
| | 460 V 60 Hz - 23.3 kW, 1765 rpm |
| Inverter - frequency control.: | Mitssubishi FR-F740-00620 EC |
| PLC control and logging: | Mitsubishi Melsec FXN-16MR |
| Pressure sensor: | GE Druck PTX 1400 |

Test Conditions.

| | |
|---|---|
| Room temperature: | 23° C. |
| Water inn: | |
| Temperature | 11° C. |
| Amount: | 20 litre/min. |
| Air pressure: | 993 mbar |
| Lifting height (generator/pump) | 2 m |

Test Procedure.

The vacuum generator used in the test was connected through its suction inlet and discharge outlet via a pipe loop to a tank containing water (not shown). Vacuum was obtained by means of throttling of a throttling valve provided on the pipe loop before the pump inlet (neither not shown). After each running of the vacuum generator for each test, the tank was aerated for 10 minutes before starting of the vacuum generator which was then run for 3 minutes before each test.

Figure 2:
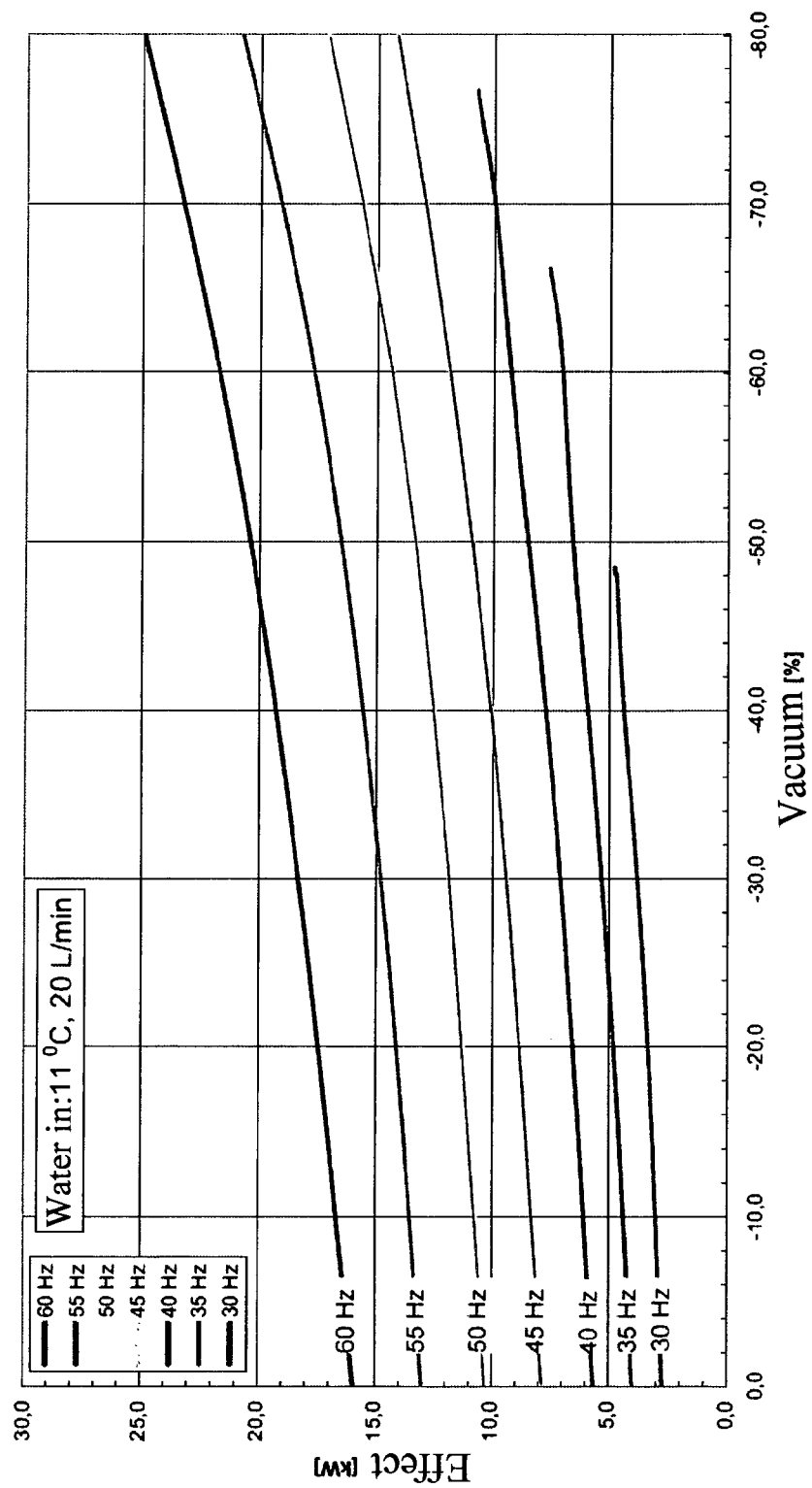
FIGS. 2-4 show curves related to power consumption, affectivity and capacity based on tests performed according to the invention. p
Figure 3:
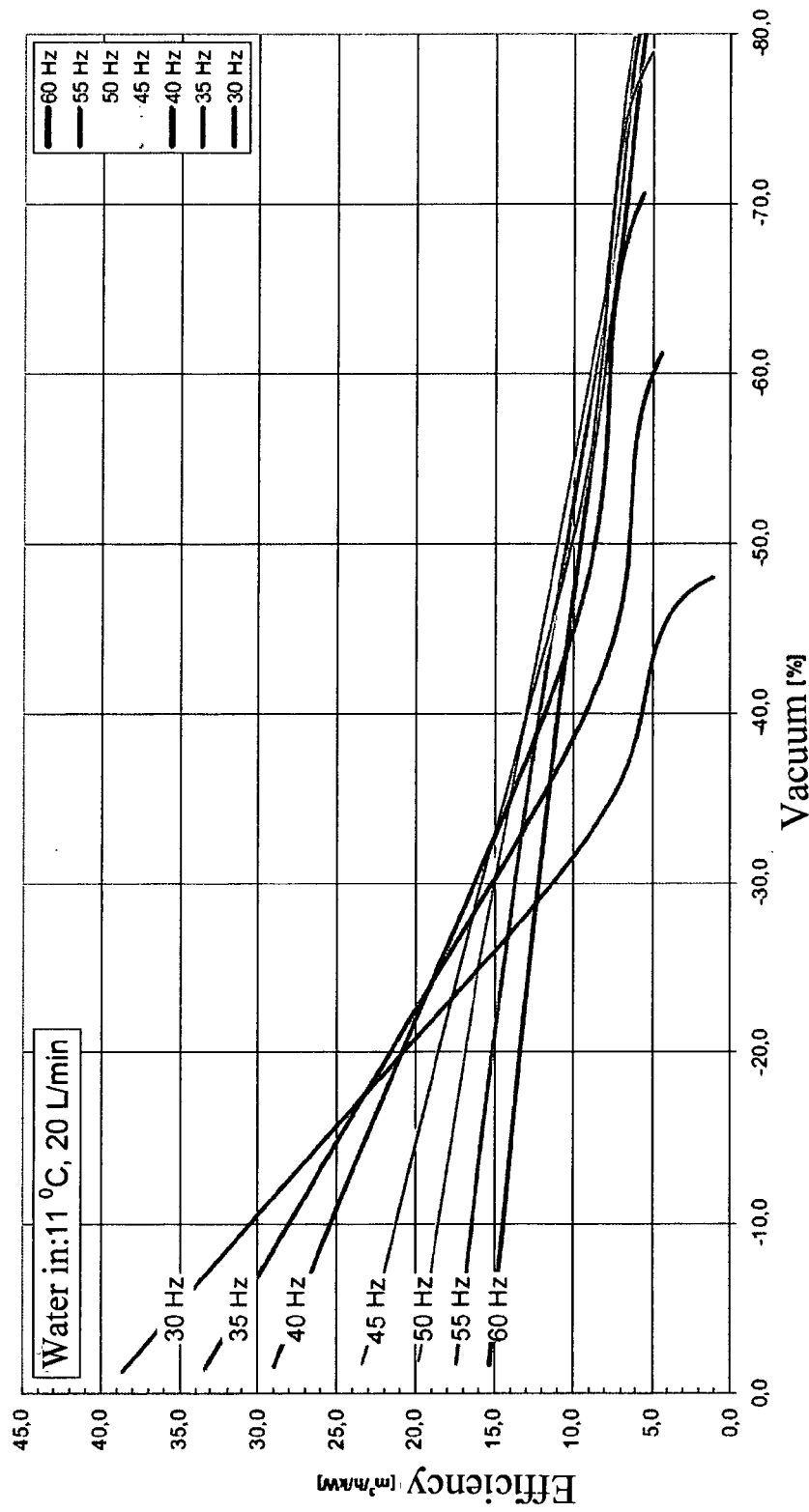
Figure 4:
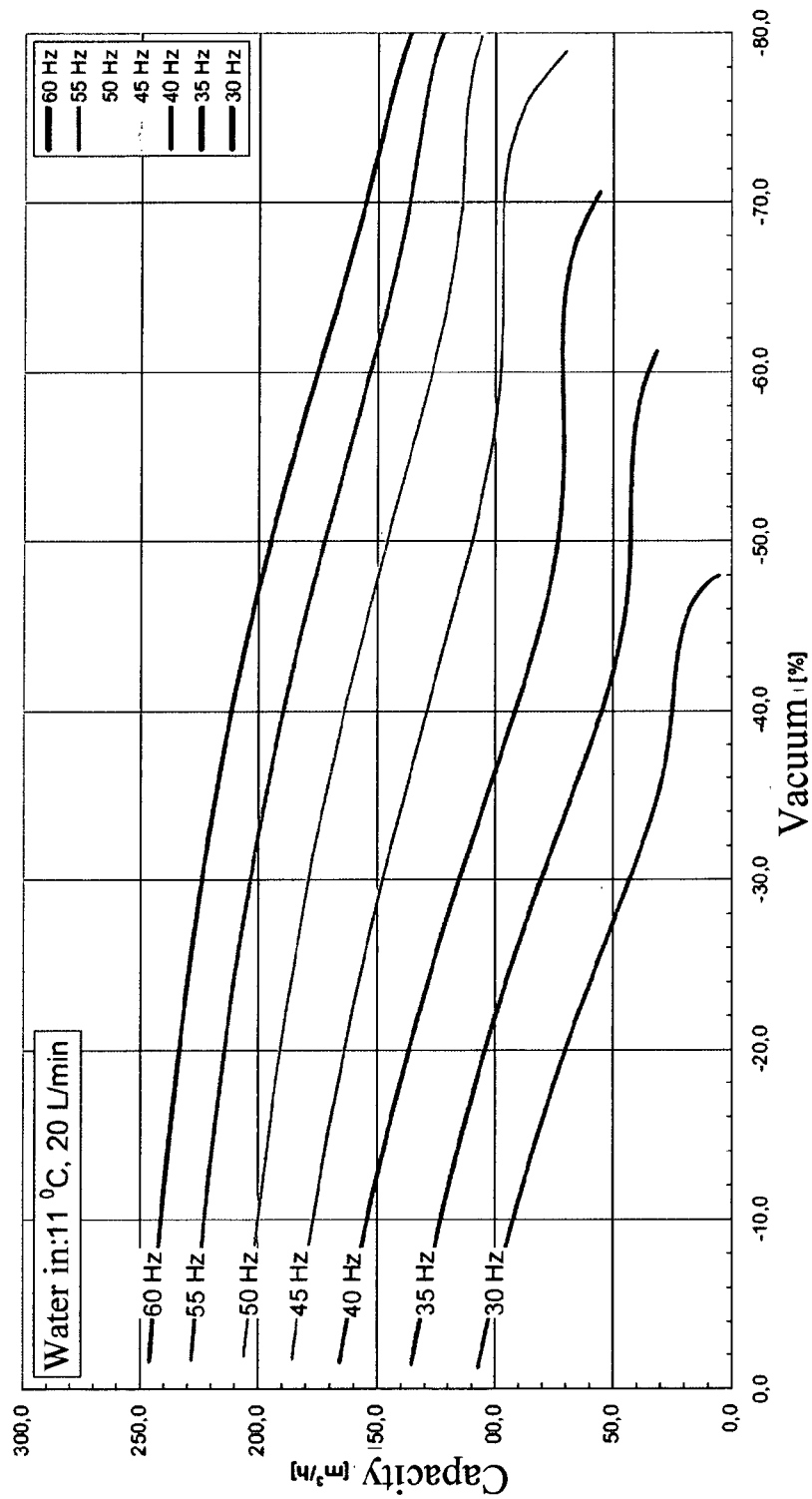

The results of the tests are shown in the accompanying FIGS. 2-4, thus:

FIG. 4 shows the capacity, Q ($m^3$/h) versus % vacuum when running the liquid ring screw pump with different rotational speeds from 30-60 Hz.

FIG. 2 shows the effect, P (kw) versus % vacuum for the same pump and with the same rotational speeds.

FIG. 3 shows the affectivity, Q/P ($M^3$/h/kw) versus % vacuum for the same pump and with the same rotational speeds.

As can be seen from the curves in FIGS. 2-4, it is possible to maintain vacuum below 40% and at the same time also maintain sufficient capacity when reducing the rotational speed from 60-30 Hz.

The invention claimed is:

1. Method for controlling vacuum generators which create a vacuum in a vacuum sewage system, the vacuum generators being in the form of electrically driven liquid ring screw pumps in such system, including beyond the generators one or more tubular collectors or suction pipelines connected to the vacuum generator and one or more toilets, urinals, grey water sinks connected to the one or more tubular collectors or suction pipelines through branch pipelines, characterised in that the vacuum of the system is maintained and controlled by controlling rotational speed (rpm) of the vacuum generators in relation to a preset vacuum requirement, further comprising controlling the rpm for each of the vacuum generators in the system with a programmable logic controller (PLC), the PLC being programmed to run a first of the vacuum generators until it reaches a set highest rpm and then start a second of the vacuum generators if the vacuum system requires increased pumping capacity.

2. A method for controlling according to claim 1, where the vacuum generators are each driven by an electrical motor, further comprising controlling the rpm of the vacuum generators by controlling the rpm for each of the electrical motors in the system with the programmable logic controller (PLC) through a frequency transformer on the basis of signals from a pressure transmitter.

3. A method for controlling vacuum generators and which create a vacuum in a vacuum sewage system, the vacuum generators being in the form of electrically driven liquid ring screw pumps in such system, including beyond the generators one or more tubular collectors or suction pipelines connected to the vacuum generator and one or more toilets, urinals, grey water sinks connected to the one or more tubular collectors or suction pipelines through branch pipelines, characterised in that the vacuum of the system is maintained and controlled by controlling rotational speed (rpm) of the vacuum generators in relation to a preset vacuum requirement, further comprising controlling the rpm for each of the vacuum generators in the system with a programmable logic controller (PLC), the PLC further being programmed to control the rpm for each of the generators when running such that they are run with the same rotational speed, from lower to higher rpm based on the required vacuum, but such that an additional vacuum generator of the generators that was not running is started when more capacity is required and one or more of the generators which are running are running at a maximum required rpm.

4. A method for controlling according to claim 3, where the vacuum generators are each driven by an electrical motor, further comprising controlling the rpm of the vacuum generators by controlling the rpm for each of the electrical motors in the system with the programmable logic controller (PLC) through a frequency transformer on the basis of signals from a pressure transmitter.

* * * * *